United States Patent
Lowell et al.

(10) Patent No.: US 6,282,265 B1
(45) Date of Patent: Aug. 28, 2001

(54) TWO-ENDED WIRELINE PAIR IDENTIFICATION SYSTEM

(75) Inventors: Alan B. Lowell, Camarillo; Michael F. Kennedy, Ventura; Glen H. Humphrey, North Hills; Kenneth S. Gold, Bell Canyon, all of CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/522,785

(22) Filed: Mar. 7, 2000

(51) Int. Cl.[7] .............................. H04M 1/24; G01R 31/08; G06F 11/00; G08C 15/00
(52) U.S. Cl. .............................. 379/25; 379/1.03; 379/12; 379/16; 379/21; 379/22; 379/22.02; 379/22.07; 379/27.01; 379/29.01; 370/248; 370/251
(58) Field of Search .............................. 379/1, 9, 10, 12, 379/14, 16, 18, 22, 23, 25, 31, 32, 34, 27, 29; 370/241, 244, 245, 248, 250, 251

(56) References Cited

U.S. PATENT DOCUMENTS

| | | | |
|---|---|---|---|
| 5,355,405 | * 10/1994 | Bernstein | 379/246 |
| 5,799,060 | * 8/1998 | Kennedy et al. | 379/29 |
| 5,857,011 | * 1/1999 | Kennedy et al. | 379/32 |
| 6,002,746 | * 12/1999 | Mulcahy et al. | 379/22 |
| 6,091,713 | * 7/2000 | Lechleider et al. | 370/248 |

* cited by examiner

*Primary Examiner*—Binh Tieu
(74) *Attorney, Agent, or Firm*—Allen, Dyer, Doppelt, Milbrath & Gilchrist, P.A.

(57) ABSTRACT

A two-ended, line-driving and receiving/tone signal analysis system performs line connection verification applying a low-distortion, low-amplitude test signal to one end of a cable pair under test and monitoring the response of a remote end wireline pair. Preferably the test signal frequency is on the order of 110 Hz, which avoids domestic and foreign AC power signal frequencies and is spectrally equidistant from their harmonics. It also avoids ringing frequencies for POTS lines, and remains safely below the 350 Hz lower limit of POTS and other telephone line system services. In response to application of the 110 Hz test signal to tip and ring segments of a wireline pair at one end of the cable bundle, the energy of the 110 Hz component, as well as that of two other 'spectrally nearby' (slightly higher at 112 Hz and slightly lower at 108 Hz), are measured at a tip and ring pair at the far end of the cable plant. If the magnitude of a Fourier component of the received 110 Hz test signal for a Fourier correlation operation cycle (FCOC) is more than a prescribed differential greater than the magnitudes of the two nearby frequencies, it is inferred that the remote tip and ring pair is the same wire pair as the wireline pair at the one end of the cable, thereby identifying the two ends of the same wireline pair.

22 Claims, 2 Drawing Sheets

TWO-ENDED WIRELINE PAIR IDENTIFICATION SYSTEM

FIELD OF THE INVENTION

The present invention relates in general to telecommunication systems, and is particularly directed to a new and improved two-ended, line-driving and receiving/tone signal analysis system for identifying opposite ends of a telephone line (tip/ring) pair, without interfering with analog signaling or digital data traffic that may be carried on the line under test.

BACKGROUND OF THE INVENTION

In the face of the increasing demand for a variety of high speed digital data communication services (such as, but not limited to HDSL, ADSL and SDSL), telecommunication service providers are continually seeking ways to optimize utilization of their very substantial existing copper plant, which was originally installed for the purpose of carrying nothing more than conventional analog (plain old telephone service or POTS) signals. Associated with this expanded utilization of the telephone line pairs is the need to verify end-to-end connections of a respective wireline pair. It is essential that the technique employed be non-intrusive to the line under test, which could be an unused spare, an idle line connected to subscriber equipment, or a busy line (namely, one carrying analog and/or digital signals). This non-intrusive requirement is especially paramount if the line is carrying digital data traffic.

SUMMARY OF THE INVENTION

In accordance with the present invention, the above-described line connection verification problem is successfully accomplished by a new and improved two-ended, line-driving and receiving/tone signal analysis system that is operative to apply a low-distortion, low-amplitude sine wave test signal to one end of a cable pair under test and to monitor the response of a remote end cable pair. In accordance with a non-limiting but preferred embodiment, the fundamental test signal frequency may be on the order of 110 Hz. This frequency was chosen as the test frequency, since it avoids domestic and foreign AC power signal frequencies and is spectrally equidistant from their harmonics (e.g., 100 Hz and 120 Hz, respectively). It also avoids ringing frequencies for POTS lines, and remains safely below the 350 Hz lower limit of POTS and other telephone line system services.

For this purpose, a pair of embedded processor-controlled test signal interface units, termed two (2)-end-verify driver/receiver units (or 2EV-DRUs), are coupled to tip and ring access locations of local and remote ends of what is hopefully, but is not necessarily, the same wire pair of a cable plant distribution system. Under commands supplied by an associated external system controller, such as a laptop computer or personal digital assistant, a respective 2EV-DRU may operate in either send/drive or receiver mode. In drive mode, the 2EV-DRU is operative to generate the (110 Hz sine wave) signal, while in receiver mode, the 2EV-DRU looks for the test signal and a pair of associated nearby frequencies slightly higher and lower than the 110 Hz sine signal on the pair to which it is connected, and it reports its detection status to its external system controller.

Each 2EV-DRU contains a test signal drive section, a test signal receive section, and a control processor (or micro-controller). The test signal drive section includes circuitry which operates under commands from the control processor to controllably source an amplitude-scaled (110 Hz) test signal to the tip-ring leads of the pair-under-test, when that 2EV-DRU is operating in drive mode. The drive mode 2EV-DRU adjusts the amplitude of the (110 Hz) test signal to a step-up transformer to adjust the current through high value resistors to the value necessary to achieve a prescribed voltage level across the tip and ring ports. Tip-ring signal feedback control is carried out using the test signal receive section to monitor voltage applied to the tip and ring ports.

In the receive section, the tip and ring ports are AC-coupled to a differential summing amplifier, the output of which contains AC components due to voice, modem signals, test signal, etc. The received and buffered signal is filtered in a bandpass filter, which attenuates most voice signals, data signaling, and power line interference signals. To compensate for potential interference, digital signal processing is executed in the control processor to extract the actual (110 Hz) test signal from the filtered signal. The bandpass filtered signal is amplified and digitized for application to the control processor.

When the 2EV-DRU is operating in drive mode, its micro-controller uses the test signal receive section to measure the 110 Hz test signal present between the tip and ring ports for controlling the magnitude of the 110 Hz signal applied by the test signal drive section to the tip and ring leads of the line under test. A complete measurement of the received signal level constitutes a Fourier correlation operation cycle (FCOC). When the 2EV-DRU is placed in drive mode, an FCOC is executed to measure the amount of signal applied to the tip and ring ports. In receiver mode, the control processor effectively prevents the test signal drive section from applying a 110 Hz sine wave test signal to the tip and ring ports. It then executes an FCOC, measures the level of the 110 Hz component, as well as that of two other 'spectrally nearby' frequency components (slightly is higher at 112 Hz and slightly lower at 108 Hz), and outputs a measurement report to the associate external system controller.

The values calculated for each of the monitored frequencies are compared. If the magnitude of the Fourier component test signal at the fundamental test frequency (110 Hz) is more than a prescribed differential greater than the magnitudes of the two 'nearby' frequencies, it is inferred that the receiver mode 2EV-DRU is connected to the same wire pair as the driver mode 2EV-DRU, indicating that the two ends of the same wire pair under test have been identified. If not, it is inferred that the receiver mode 2EV-DRU is connected to a wire pair other than the selected wire pair under test to which the driver mode 2EV-DRU is currently connected.

The external controller associated with the driver mode 2EV-DRU then instructs the external controller associated with the receiver mode 2EV-DRU to cause an associated tip/ring pair access device, such as a portable test head to which a multi-terminal connector at respective terminating end of the cable plant is connected, to switch the receiver mode 2EV-DRU to a different wire pair, so that the above-described test may be carried out for the new pair. This process may be repeated, as necessary, for additional wire pairs until the remote ends of the tip and ring pair of the selected line under test have been identified.

DETAILED DESCRIPTION

Before describing in detail the new and improved two-ended line pair identification system in accordance with the present invention, it should be observed that the invention resides primarily in what are effectively modular arrangements of conventional communication circuits and associated digital signal processing components and attendant supervisory control circuitry therefor, that controls the operations of such circuits and components. In a practical implementation that facilitates their incorporation into printed circuit cards of telecommunication test equipment, these modular arrangements may be readily configured as field programmable gate array (FPGA)-implementations, application specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 1:
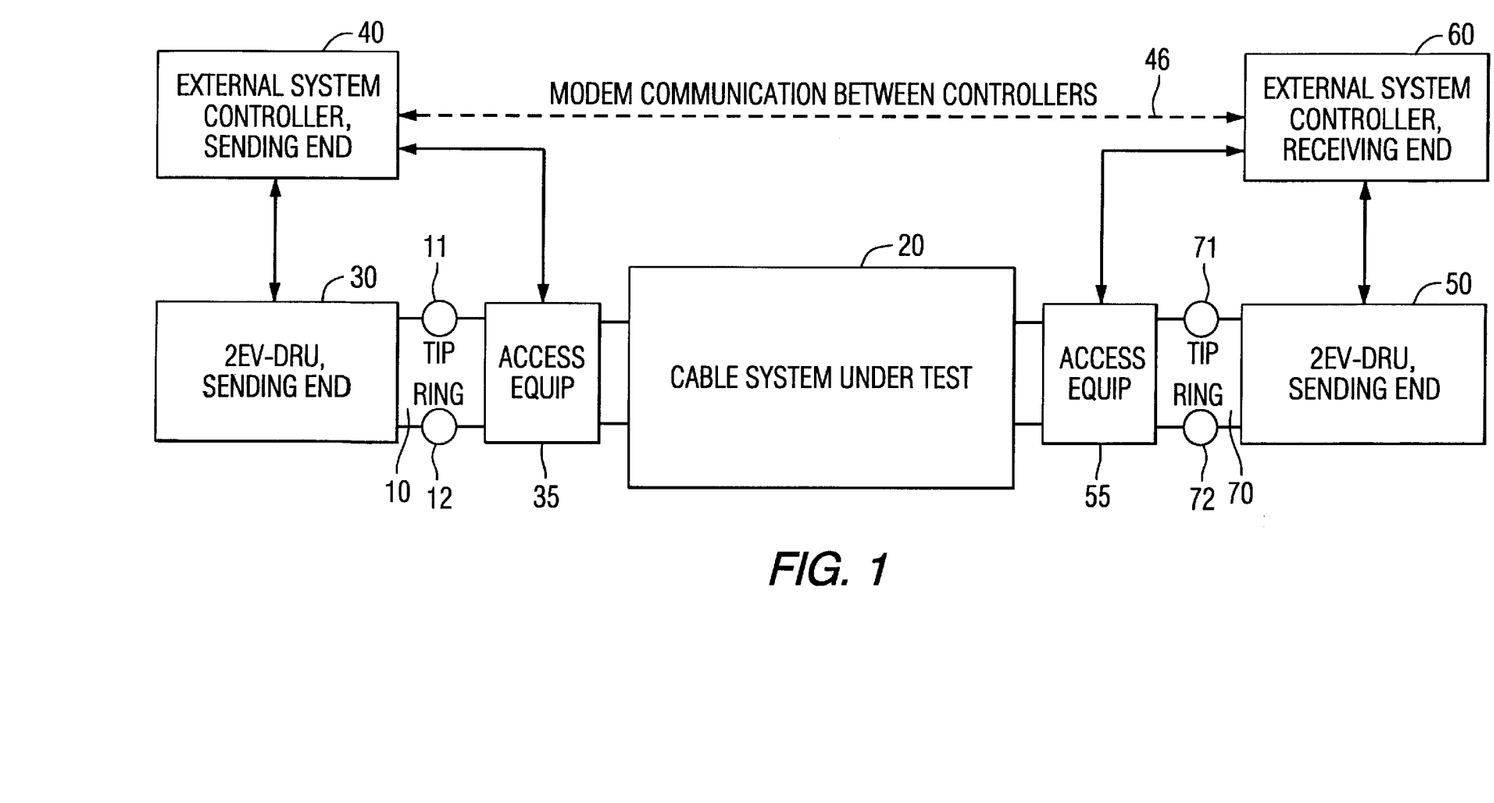
FIG. 1 diagrammatically illustrates the two-ended line pair identification system of the present invention.

Attention is now directed to FIG. 1, which diagrammatically illustrates the two-ended line pair identification system of the present invention for detecting spaced apart (e.g., local and remote) ends of a respective (copper) wireline cable pair 10 contained within a plurality of (utilized and/or un-utilized) wireline pairs of some phone-line cable distribution system 20. The wireline pairs that are provided to either end of the test system may include spare wire pairs, POTS, DSL, ISDN, El or T1 pairs, which may or may not be in use at the time.

The (local and remote) ends of the cable distribution system may be terminated in a customary manner by multi-terminal frames, that are configured to be mechanically and electrically interfaced by connector components that allow selective bridging onto any of the tip/ring pairs of the cable plant by various test equipments, such as personal digital assistant (PDA) configured test units, that allow direct interactive control by telecommunication service personnel operating such units or remote control by an associated supervisory communication link. As a non-limiting example, such test equipment may comprise an RVU (records verification unit) manufactured by Harris Corporation.

Figure 2:
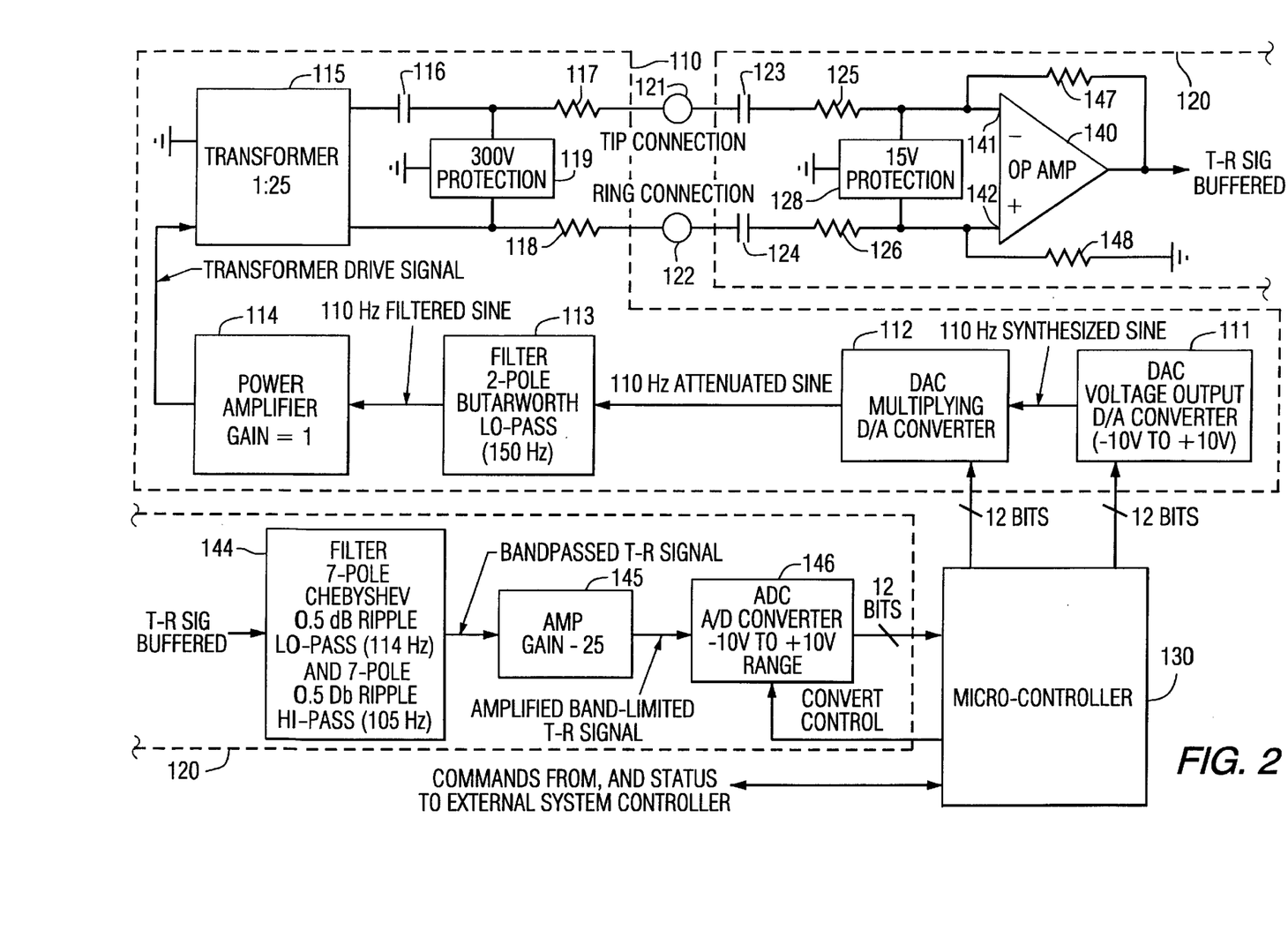
FIG. 2 shows the circuitry architecture of a 2EV-DRU of is the system of FIG. 1.

Respective tip and ring leads 11 and 12 of a first or 'west' end of a selected pair 10 under test, within the cable distribution system 20, are coupled to a first 2-End-Verify Driver/Receiver Unit 30 (or 2EV-DRU), the architecture of which is shown in FIG. 2. As will be described, in response to commands supplied by an associated external system controller 40, the 2EV-DRU 30 may operate in send/drive or receiver mode with respect to the tip and ring leads 11 and 12 of the selected wire pair 10. The 2EV-DRU is controlled by means of a an internal high-speed micro-controller using an embedded software system. This micro-controller responds to commands from, and provides status to the associated external system controller. The external system controller commands the 2EV-DRU to be either a driver or a receiver. Only when in drive mode, does the 2EV-DRU generate the test signal (e.g., 110 Hz sine wave). In receiver mode, the 2EV-DRU looks for 110 Hz test signal energy on the pair to which it is connected, and it reports its detection status to the external system controller, on a regular basis (nominally every half-second).

The external system controller 40, which may comprise a laptop computer and the like, is operative to cause an associated piece of cable access and test equipment 35, such as an RVU referenced above, interfaced with a multi-pin connector at the west terminal end of the cable distribution system 20, to selectively connect the 2EV-DRU 30 to any of the multiple tip/ring pairs of the cable plant. Where the 2EV-DRU 30 is configured for driver mode operation, the system controller 40 commands the driver-mode unit 30 to generate a test signal.

In addition, via an auxiliary link 46 to a remote external system controller 60, the system controller 40 is operative to sequentially provide tip-ring pairs to a receiver-mode 2EV-DRU connected to the remote end of the cable plant 20. As a non-limiting example, the auxiliary link 46 may comprise a designated spare pair within the cable plant 20 proper, or an external wireline or wireless communication link. In FIG. 1, the 'remote' 2EV-DRU is shown as a second or 'east' end 2EV-DRU 50, coupled to the external system controller 60. The east end 2EV-DRU 50 is coupled via associated cable access and test equipment 55, such as the above-referenced RVU, to respective tip and ring leads 71 and 72 of a selected wireline pair 70, which may or may not be the same wireline pair 10 to which 2 EV-DRU 30 is coupled.

As pointed out above, the significant aspect of the configuration of a respective 2 EV-DRU is its ability to be connected to and operated without impairing the normal operation of any wireline pair within the cable distribution plant. For this purpose, a respective 2 EV-DRU performs all of its testing using a low-distortion, low-amplitude (e.g., about 150 mV p-p) test signal frequency that avoids other frequencies that may be imposed upon or carried by the cable plant. In addition, since DSL systems are continually improving and extending their frequencies of operation, there is no effective safe upper limit (even in the megahertz range) at which testing signals can be categorically applied to unknown copper wireline pairs without possible interference issues for some future DSL signal.

In accordance with a non-limiting but preferred embodiment, the test signal comprises a sine wave at a frequency on the order of 110 Hz. This frequency was chosen as the test frequency, since its fundamental spectral component (110 Hz) avoids both domestic and foreign AC power signal frequencies and is also spectrally spaced apart from their harmonics (e.g., 100 Hz and 120 Hz, respectively). It is also spectrally separated from ringing frequencies for POTS lines, and remains safely below the 350 Hz lower limit of POTS and other telephone line system services. It should be observed that the invention is not limited to this or any other particular frequency. What is important is that the fundamental frequency of the test signal, as well as the frequencies of associated 'nearby' harmonics conform with the above constraints. Thus, a frequency of 109.5 Hz, as a non-limiting example, could be used for the test frequency. Its equidistant spectral spacing from domestic and foreign power harmonics of 100 Hz and 120 Hz makes a frequency of 110 Hz of the current embodiment a practical choice for the test frequency.

The ability of the 2 EV-DRU to be unobtrusively connected to any wireline pair is achieved by employing very high coupling impedances and very short test cables for tip and ring lead connections. As a consequence, when a 2 EV-DRU is coupled to a tip-ring pair under test, the electrical transients are very small, and do not disturb signals on any of the above-referenced telephone-line types. Tests have shown that a 150 mv p-p voltage applied at 110 Hz will not disturb any of currently known phone line conditions to which the 2 EV-DRU may be coupled.

Referring now to FIG. 2, a respective 2 EV-DRU is shown as being comprised of three main sections: a test signal drive section 110, a test signal receive section 120, and a micro-controller 130. In accordance with a non-limiting, preferred implementation, the 2 EV-DRU circuitry may operate on +5 V digital logic power and +/−15 V analog power derived from an external DC power source and DC-DC converted to appropriate power levels.

The test signal drive section 110 serves to source the test signal to the tip-ring leads of the pair-under-test. For this purpose, the micro-controller 130 outputs a voltage value representative digital code (e.g., a twelve bit code) to a first digital-to-analog converter (DAC) 111 at a prescribed repetition rate, e.g., every 181.81 microsec (one-fiftieth of a 110 Hz period), so that DAC 111 produces a 20 Vp-p sine wave at a test signal frequency of 110 Hz. Based upon a closed loop process (described below), micro-controller 130 may supply a second (twelve bit) digital code to a (a 12-bit multiplying) DAC 112, in order to controllably attenuate and or modulate the sine wave synthesized out of the DAC 111. The attenuation range of DAC 112 allows the amplitude of 110 Hz synthesized sine voltage to be adjusted from 0 Vp-p (for a digital code=0) up to a prescribed value (e.g., 20 Vp-p, for a digital code value of 4095), which serves to minimize distortion of the 110 Hz sine wave at low output levels.

The attenuated 110 Hz sine wave test signal generated by the DAC 112 is low-pass filtered in a low pass filter 113 to eliminate higher frequency components, that might interfere with some digital signal telephone lines. The filtered 110 Hz sine wave signal output from low pass filter 113 is buffered in a (unity gain) buffer amplifier 114, which provides a maximum sine wave amplitude of 20 Vp-p. The buffered sine wave signal is applied to the primary winding of a (1:25) step-up transformer 115, which may be implemented as a UL-rated toroidal ferrite transformer, as a non-limiting example. The step-up transformer 115 provides both AC and DC isolation from the line, as well as Belcor and UL high-voltage interference testing standoff capability.

From its secondary winding, the step up-transformer 115 outputs a 110 Hz output sine wave test signal, the amplitude of which can be varied up to 500 Vp-p. This stepped-up sine wave test signal is coupled through a DC-blocking capacitor 116 and a pair of high valued (100 Kohm) coupling resistors 117 and 118 to respective tip and ring ports 121 and 122 for driving tip and ring leads of the wireline pair-under-test. An overvoltage protection circuit 119 is coupled in circuit with the tip and ring leads, as shown. The amount of current supplied through the tip and ring ports 121 and 122 to the wireline pair depends upon the nature of the pair-under-test.

Because of the ability of the 2 EV-DRU's control processor 113 to controllably adjust the amplitude of the test signal applied to the step-up transformer, it is able to limit the current to the value necessary to achieve a 150 mvp-p level across the tip and ring ports 121 and 122, regardless of how the wireline pair is terminated. This control is made adaptive by tip-ring signal feedback control using the test signal receive section 120 to monitor the applied voltage.

The tip and ring ports 121 and 122 are also coupled as inputs to the test signal receive section 120. In particular, the tip and ring ports 121 and 122 are AC-coupled through high voltage isolation capacitors 123 and 124, and associated high valued (e.g., 200 Kohm) series coupling resistors 125 and 126 to inputs 141 and 142 of a differential summing amplifier 140, respectively. The summing amplifier 140 includes a (200 Kohm) feedback resistor 147 coupled to (−) input port 141 and a (200 Kohm) ground-referenced resistor 148 coupled to (+) input port 142. As in the transmit section, an overvoltage protection circuit 128 is coupled in circuit with the tip and ring leads, as shown. The signal produced by the summing amplifier 140 contains AC components due to voice, modem signals, a test signal, etc., which can be accommodated within the nominal ±12 volt range of the 15-volt analog circuitry of the 2 EV-DRU.

The buffered signal is coupled to a bandpass filter 144, which may be implemented as a combination of a 7-pole high-pass, 7-pole low-pass active filter. For the present example, filter 144 may have a center frequency at 110 Hz and a bandwidth of 8 Hz. This filter functions to attenuate most voice signals, data signaling, and power line interference signals. However, because of burstiness of the voice signals, spectral components of the voice signals may fall within the filter's bandwidth. In addition, transients on the pair-under-test can cause transient ringing (the filter's impulse response), which appear in the output of the filter. To compensate for this potential interference, downstream digital signal processing in the control processor 130 is employed to extract the fundamental component (110 Hz) of the test signal from the filtered signal.

The bandpass filtered signal is amplified in a (gain of 25) amplifier 145 and applied to an analog-to-digital converter (ADC) 146, which may be implemented by means of a fast 12-bit converter having a +/−10 V range. Because of the band pass filtering, and closed loop adjustment of the 110 Hz test signal applied to the tip-ring pair under test, this range is sufficient to handle any expected signals. Under the command of a control signal from the micro-controller 130, the ADC 146 outputs a digital (e.g., 12 bit) code representative of the filtered and amplified voltage of the received signal. In accordance with a non-limiting embodiment, the micro-controller 130 may command an A-D conversion operation every 181.81 microsec (i.e., 50 samples per 110 Hz cycle or 5,500 samples per second).

In operation, when the 2 EV-DRU is to operate in drive mode, the micro-controller 130 uses the test signal receive section 120 to measure any 110 Hz test signal energy that may be present between the tip and ring ports 121 and 122, and thus appropriately control the magnitude of the 110 Hz test signal to be applied by the test signal drive section 110 to the tip and ring leads of the line under test. The process of making one complete measurement of the received signal level is termed a Fourier correlation operation cycle (FCOC), and is described in detail below. When the 2 EV-DRU is in drive mode, an FCOC is executed to measure the amount of signal applied to the tip and ring ports 121 and 122. Through an incremental process, the 2 EV-DRU may iteratively index the 110 Hz sine wave drive voltage to the step-up transformer 115 from a base value (e.g., 0 volts) up to approximately 150 mvp-p across the tip and ring ports. The process begins with a relatively low valued transformer drive voltage (e.g., zero volts), so as not to significantly disturb the cable pair under test, and then gradually increases the amplitude of the drive signal to the 150 mvp-p drive level desired for 2 EV testing.

When the 2 EV-DRU is to operate in receiver mode, the micro-controller 130 sets the attenuation value of the DAC 112 to zero, so as to effectively null out or prevent a 110 Hz sine wave test signal from being applied to the tip and ring ports by the transformer 115 of the test signal drive section 110. The micro-controller 130 then executes an FCOC, measures the level of the 110 Hz component, as well as that of two other 'spectrally nearby' signal frequencies (e.g., 108 Hz and 112 Hz), and generates a measurement report, which is sent to the external system controller. Based upon analyses of currently employed telephone line usage systems, it has been determined that when the magnitude of the fundamental Fourier component of the test signal at 110 Hz is more than a value on the order of 20 dB or more (e.g., 24 dB, as a non-limiting example) than the magnitudes of the 'nearby' frequencies, it can be inferred that the receiver mode 2 EV-DRU is connected to the same wire pair as the driver mode 2 EV-DRU.

Fourier Correlation Operation Cycle (FCOC)

The spectral distribution of energy from a recurring analog signal f(x) of period 2 L can be broken into an infinite series of sine and cosine components—a Fourier series—with the lowest frequency required (other than DC) being that of the basic recurring period. The coefficients of each of the sinusoidal components are obtained by integrating (over the basic recurring period) the product of the recurring analog signal and a unity-amplitude sine (or cosine) for the fundamental frequency (the inverse of the basic recurring period) as given in the following equation:

$$f(x) = a_0/2 + \sum_{n=1}^{\infty} [a_n\cos(2\pi\omega n/L) + b_n\sin(2\pi\omega n/L)]$$

where:

$$a_n = 2/L \int_{x=0}^{x=L} (f(x)\cos(2\pi xn/L) dx, n = 0, 1, 2, \ldots ;$$

and $$b_n = 2/L \int_{x=0}^{x=L} (f(x)\sin(2\pi xn/L) dx, n = 1, 2, \ldots ;$$

and the magnitude of the harmonic (n) is the square root of the sum of the squares of the sine and cosine coefficients, and is termed the Fourier correlation coefficient herein as:

$$m_n = \sqrt{(b_n^2 + a_n^2)}.$$

In the course of testing for 2 EV-DRU, the recurring period is the length of time the test is run before the Fourier integration process is terminated. For 2 EV-DRU, the test time may be set at 0.500 seconds, as a non-limiting example. The 'harmonic' is calculated as the ratio of the test period to the frequency-of-interest period. Therefore:

for the lower 'nearby' frequency of 108 Hz, the harmonic is: 0.500 sec/(1/108)=54th harmonic;

for the set frequency of 110 Hz, the harmonic is: 0.500 sec/(1/110) =55th harmonic; and for the upper 'nearby' frequency of 112 Hz, the harmonic is: 0.500 sec/(1/112) =56th harmonic.

The choice of a 0.500 seconds test period and 108 Hz and 112 Hz as the respective lower and upper nearby signals is based upon the following. Choosing even numbered frequencies (including 110 Hz for the test frequency), at 0.500 seconds, produces an integral number of cycles for all three frequencies. Therefore, the "noise" contribution to the coefficient of any one frequency due to energy at the other frequencies should be zero (or near zero). This is particularly important when the frequency of interest is the 108 Hz or 112 Hz signal. When the wire being analyzed by way of a receiver mode 2 EV-DRU is actually the one being driven by a remote send mode 2 EV-DRU, the amount of 110 Hz energy can be expected to be large. As a result, without noise cancellation, there would be an inaccurate estimate of the frequency's coefficient due to the contribution of the large 110 Hz signal.

The FCOC is a specific application of the Fourier correlation integral discussed above, for 2 EV-DRU purposes. Each sample time (at the exact rate of 50 samples per 110 Hz cycle or 5,500 samples per second), a digitized value of the received voltage is coupled to the micro-controller 130, and the following sets of equations are executed. In these equations, N varies from a product of 1 to 55 times 50 (or 2750).

In order to calculate the coefficient for a 108 Hz signal component, the following pair of equations is executed:

$$a_{54-108} = 2/(55*50)\sum_{N=0}^{2750} [(ADC(N)\cos\{(2\pi xN/50)*(108/110)\}]$$

$$b_{54-108} = 2/(55*50)\sum_{N=0}^{2750} [(ADC(N)\sin\{(2\pi xN/50)*(108/110)\}]$$

At the completion of 2750 cycles (N 2750), the coefficient of the 108 Hz magnitude is calculated as:

$$m_{54-108} = \sqrt{(b_{54-108}^2 + a_{54-108}^2)}.$$

For calculating the coefficient of the 110 Hz magnitude, the following pair of equations is executed:

$$a_{55-110} = 2/(55*50)\sum_{N=0}^{2750} [(ADC(N)\cos(2\pi xN/50)]$$

$$b_{55-110} = 2/(55*50)\sum_{N=0}^{2750} [(ADC(N)\sin(2\pi xN/50)]$$

At the completion of 2750 cycles (N=2750), the coefficient of the 110 Hz magnitude is calculated as:

$$m_{55-110} = \sqrt{(b_{55-110}^2 + a_{55-110}^2)}.$$

For calculating the coefficient of the 112 Hz magnitude, following pair of equations is executed:

$$a_{56-112} = 2/(55*50)\sum_{N=0}^{2750} [(ADC(N)\cos\{(2\pi xN/50)*(112/110)\}]$$

$$b_{56-112} = 2/(55*50)\sum_{N=0}^{2750} [(ADC(N)\sin\{(2\pi xN/50)*(112/110)\}]$$

At the completion of the 2750 cycles (N=2750), the coefficient of the 112 Hz magnitude is calculated as:

$$m_{56-112} = \sqrt{(b_{56-112}^2 + a_{56-112}^2)}.$$

The values calculated for each of the frequencies are then compared. As pointed out above, if the magnitude of the fundamental Fourier component of the test signal at 110 Hz is more than a prescribed value (e.g., on the order of 20 dB or more, such as but not limited to 24 dB) greater than the magnitudes of the 'nearby' frequencies, it is inferred that the receiver mode 2 EV-DRU is connected to the same wire pair as the driver mode 2 EV-DRU, indicating that the two ends of the wire under test have been identified. If not, it is inferred that the receiver mode 2 EV-DRU is connected to a wire pair other than the selected wire pair under test to which the driver mode 2 EV-DRU is currently connected. Via communication link 46, the external controller associated with the driver mode 2 EV-DRU then instructs the external controller associated with the receiver mode 2 EV-DRU to cause its associated cable access and test equipment to connect the receiver mode 2 EV-DRU to a different wire pair, so that the above-described test may be carried out for the new pair. This process is repeated, as necessary, until the remote ends of the tip and ring pair of the line under test have been identified.

As will be appreciated from the foregoing description, the dual (two-ended), line-driving and receiving/tone signal analysis system of the present invention successfully resolves the above-described line connection verification problem by applying a low-distortion, low-amplitude sine wave test signal to one end of a cable pair under test and monitoring the response of a remote end cable pair. In response to a driver mode 2 EV-DRU at one end of the cable bundle applying the test signal to the wire pair under test, the receiver mode 2 EV-DRU at the other end of the cable executes an FCOC, measures the level of the fundamental frequency component of the test signal, as well as those of two other 'spectrally nearby' harmonic frequencies, and outputs a measurement report to the associate external system controller. If the magnitude of the fundamental Fourier component of the test signal is more than a prescribed differential greater than the magnitudes of the two 'nearby' frequencies, it is inferred that the receiver mode 2 EV-DRU is connected to the same wire pair as the driver mode 2 EV-DRU, thereby identifying the two ends of the same wire pair.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of identifying spaced apart locations of a prescribed communication link among a plurality of communication links comprising the steps of:
   (a) applying a test signal to a first location of said prescribed communication link;
   (b) monitoring an arbitrary communication link among said plurality of communication links, at a second location along said plurality of communication links spaced apart from said first location; and
   (c) in response to energy content of a prescribed spectral component of said test signal received at said second location of said arbitrary communication link satisfying a prescribed relationship with respect to energy content of one or more other spectral components received at said second location of said arbitrary communication link, identifying said arbitrary communication link as said prescribed communication link, and further comprising the step of measuring in a drive mode any test signal energy to control the magnitude of the test signal and in a receive mode, measuring the test signal energy of the test signal and at least two spectrally near signal frequencies to infer component coupling to the same communication link.

2. A method according to claim 1, wherein step (c) further comprises identifying said arbitrary communication link as a communication link other than said prescribed communication link, in response to energy content of a prescribed spectral component of said test signal received at said second location of said arbitrary communication link failing to satisfy said prescribed relationship with respect to energy content of one or more other spectral components received at said second location of said arbitrary communication link.

3. A method according to claim 2, wherein step (c) further comprises, in response to identifying said arbitrary communication link as a communication link other than said prescribed communication link, repeating steps (b) and (c) for another communication link other than said arbitrary communication link.

4. A method according to claim 1, wherein said prescribed relationship requires energy content of said prescribed spectral component of said test signal received at said second location of said arbitrary communication link to exceed energy content of one or more other spectral components received at said second location of said arbitrary communication link by at least a given differential therebetween.

5. A method according to claim 1, wherein said plurality of communication links comprise a plurality of wireline pairs of a multi-wireline pair telecommunication cable plant, that include one or more of unused spares, idle wireline pairs connected to subscriber equipment, and wireline pairs lines carrying analog and/or digital signals.

6. A method according to claim 1, wherein said test signal comprises a low-distortion, low-amplitude signal that avoids domestic and foreign AC power signal frequencies and their harmonics, is spectrally separate from ringing frequencies for POTS lines, and is below the lower frequency limit of POTS and other telephone line system services.

7. A method according to claim 1, wherein said prescribed relationship requires energy content at a fundamental frequency of said test signal received at said second location of said arbitrary communication link to exceed energy content of each of nearby frequency components, that are respectively higher than and lower than said fundamental frequency of said test signal by a frequency difference associated with adjacent harmonics of said fundamental frequency, by at least a predetermined energy differential therebetween.

8. A method according to claim 1, wherein said test signal has a frequency on the order of 110 Hz.

9. A method according to claim 7, wherein said predetermined energy differential is on the order of 20 dB or more.

10. A method according to claim 6, wherein step (c) includes filtering electrical energy received at said second location of said arbitrary communication link, so as to attenuate potential interference signals, such as voice signals, data signaling, and power line signals.

11. A method according to claim 1, wherein step (c) includes processing energy received at said second location of said arbitrary communication link in accordance with a Fourier correlation operation cycle.

12. A method according to claim 1, wherein step (a) comprises applying said test signal through a high impedance coupling circuit to said first location of said prescribed communication link.

13. A method of conducting spaced apart location identification of a selected telephone tip/ring wireline pair within a cable plant containing a plurality of telephone tip/ring wireline pairs, that include one or more of unused spares, idle wireline pairs connected to subscriber equipment, and wireline pairs carrying analog and/or digital signals, without interfering with analog signaling or digital data traffic that may be present on said selected telephone tip/ring wireline pair, said method comprising the steps of:

(a) applying, to a first location of said selected telephone tip/ring wireline pair, a low-amplitude test signal that avoids domestic and foreign AC power signal frequencies and their harmonics, is spectrally separate from ringing frequencies for POTS lines, and is below the lower frequency limit of POTS and other telephone line system services;

(b) monitoring an arbitrary telephone tip/ring wireline pair of said cable plant, at a second location thereof along said plurality of communication links spaced apart from said first location, for the presence of energy having a frequency component of said test signal; and (c) identifying said arbitrary telephone tip/ring wireline pair as said selected telephone tip/ring wireline pair, and thereby identifying said second location as that of said selected telephone tip/ring wireline pair, in response to energy content at said fundamental frequency of said test signal received at said second location of said arbitrary telephone tip/ring wireline pair in step (b) exceeding energy content of each of nearby frequency components, that are slightly higher and lower harmonics of said test signal, by a predetermined energy differential therebetween, said identifying including the step of measuring in a drive mode any test signal energy to control the magnitude of the test signal and in a receive mode, measuring the test signal energy of the test signal and at least two spectrally near signal frequencies to infer component coupling to the same communication link.

14. A method according to claim 13, wherein step (c) includes processing energy received at said second location of said arbitrary telephone tip/ring wireline pair in accordance with a Fourier correlation operation cycle.

15. A system for identifying spaced apart locations of a prescribed communication link among a plurality of communication links comprising:

a first test signal interface unit which is operative to apply a test signal to a first location of said prescribed communication link; and a second test signal interface unit which is operative to process energy received at an arbitrary communication link among said plurality of communication links, at a second location thereof spaced apart from said first location and, in response to energy content of a prescribed spectral component of said test signal received thereby satisfying a prescribed relationship with respect to energy content of one or more other spectral components received thereby, identifying said arbitrary communication link as said prescribed communication link, said first and second test signal interfaces being operable in a drive mode and receive mode, and operable for measuring in a drive mode any test signal energy to control the magnitude of the test signal and in a receive mode, measuring the test signal energy of the test signal and at least two spectrally near signal frequencies to infer component coupling to the same communication link.

16. A system according to claim 15, wherein said test signal comprises a low-distortion, low-amplitude signal that avoids domestic and foreign AC power signal frequencies and their harmonics, is spectrally separate from ringing frequencies for POTS lines, and is below the lower frequency limit of POTS and other telephone line system services.

17. A system according to claim 15, wherein said test signal has a fundamental frequency on the order of 110 Hz.

18. A system according to claim 15, wherein said prescribed relationship requires energy content at a fundamental frequency of said test signal received at said second location of said arbitrary communication link to exceed energy content of each of nearby frequency components, that are higher and lower harmonics of said test signal, by at least a predetermined energy differential therebetween.

19. A system according to claim 15, wherein each of said first and second test signal interface units has the same circuit configuration and is controllably operative to operate as said first test signal interface and apply said test signal to said first location of said prescribed communication link, or to operate as said second test signal interface and process energy received thereby in accordance with said prescribed relationship.

20. A system according to claim 19, wherein each of said first and second test signal interface units is operative to be remotely controlled by associated supervisory control units that communicate with one another to controllably configure test functionality of said first and second test signal interface units.

21. A system according to claim 15, wherein said second test signal interface unit is operative to process energy received thereby in accordance with a Fourier correlation operation cycle.

22. A system according to claim 15, wherein said first test signal interface unit which is operative to apply said test signal through a high impedance coupling circuit to said first location of said prescribed communication link, and wherein said second test signal interface unit which is operative to monitor energy by way of a high impedance coupling circuit.

* * * * *

UNITED STATES PATENT AND TRADEMARK OFFICE
CERTIFICATE OF CORRECTION

PATENT NO. : 6,282,265 B1
DATED : August 28, 2001
INVENTOR(S) : Alan B. Lowell, Michael F. Kennedy, Glen H. Humphrey and Kenneth S. Gold It is certified that error appears in the above-identified patent and that said Letters Patent is hereby corrected as shown below:

<u>Drawings,</u>
Delete FIG. 1, insert New FIG. 1
--

Delete FIG. 2, insert New FIG. 2
--

UNITED STATES PATENT AND TRADEMARK OFFICE
CERTIFICATE OF CORRECTION

PATENT NO. : 6,282,265 B1
DATED : August 28, 2001
INVENTOR(S) : Alan B, Lowell, Michael F. Kennedy, Glen H. Humphrey and Kenneth S. Gold It is certified that error appears in the above-identified patent and that said Letters Patent is hereby corrected as shown below:

Column 2,
Line 36, delete: "(slightly is higher" insert -- (slightly higher --
Line 67, delete: "is the system of FIG. 1." insert -- the system of FIG. 1. --

Column 7,
Line 47, delete: $m_n = \sqrt{(b_n^2 + a_n^2)}.$ insert -- $m_n = \sqrt{(b_n^2 = a_n^2)}.$ --

Column 8,
Line 31, delete: $m_{54-108} = \sqrt{(b^2_{54-108} + a^2_{54-108})}.$ insert -- $m_{54-108} = \sqrt{(b^2_{54-108} - a^2_{54-108})}.$ --

Line 46, delete: $m_{55-110} = \sqrt{(b^2_{55-110} + a^2_{55-110})}.$ insert -- $m_{55-110} = \sqrt{(b^2_{55-110} + a^2_{55-110})}.$ --

UNITED STATES PATENT AND TRADEMARK OFFICE
CERTIFICATE OF CORRECTION

PATENT NO.    : 6,282,265 B1
DATED         : August 28, 2001
INVENTOR(S)   : Alan B, Lowell, Michael F. Kennedy, Glen H. Humphrey and Kenneth S. Gold It is certified that error appears in the above-identified patent and that said Letters Patent is hereby corrected as shown below:

<u>Column 8,</u>
Line 60, delete: $m_{56-112} = \sqrt{(b^2_{56-112} + a^2_{56-112})}.$ insert -- $m_{56-112} = \sqrt{(b^2_{56-112} + a^2_{56-112})}.$ --

Signed and Sealed this

Fourteenth Day of May, 2002

*Attest:*

JAMES E. ROGAN
*Attesting Officer*     *Director of the United States Patent and Trademark Office*